United States Patent [19]
Ishizuka et al.

[11] Patent Number: 6,116,023
[45] Date of Patent: Sep. 12, 2000

[54] INTERNAL COMBUSTION ENGINE WITH NOX ABSORBENT CATALYST

[75] Inventors: Yasuji Ishizuka, Kanagawa; Kimiyoshi Nishizawa, Yokohama, both of Japan

[73] Assignee: Nissan Motor Co., Ltd., Yokohama, Japan

[21] Appl. No.: 09/093,305

[22] Filed: Jun. 9, 1998

[30] Foreign Application Priority Data

Jun. 9, 1997 [JP] Japan ................................. 9-151065

[51] Int. Cl.$^7$ ....................................................... F01N 3/10
[52] U.S. Cl. .............................. 60/301; 60/285; 60/276; 123/674
[58] Field of Search ............................ 60/276, 277, 285, 60/286, 301; 123/674; 701/103, 115

[56] References Cited

U.S. PATENT DOCUMENTS

| | | | |
|---|---|---|---|
| 5,448,887 | 9/1995 | Takeshima | 60/278 |
| 5,657,627 | 8/1997 | Akazaki et al. | 60/276 |
| 5,713,199 | 2/1998 | Takeshima et al. | . |
| 5,715,679 | 2/1998 | Asanuma et al. | . |
| 5,735,119 | 4/1998 | Asanuma et al. | 60/276 |
| 5,740,676 | 4/1998 | Agustin et al. | 60/276 |

FOREIGN PATENT DOCUMENTS

| | | |
|---|---|---|
| 0 581 279 | 2/1994 | European Pat. Off. . |
| 0 636 770 | 2/1995 | European Pat. Off. . |
| 0 883 787 | 9/1996 | European Pat. Off. . |
| 6-66185 | 3/1994 | Japan . |
| 6-272540 | 9/1994 | Japan . |
| 6-294319 | 10/1994 | Japan . |
| 7-139340 | 5/1995 | Japan . |
| 7-139397 | 5/1995 | Japan . |
| 7-166851 | 6/1995 | Japan . |
| 8-232644 | 9/1996 | Japan . |
| 8-260948 | 10/1996 | Japan . |
| 8-260949 | 10/1996 | Japan . |
| 8-261041 | 10/1996 | Japan . |
| 9-287513 | 11/1997 | Japan . |

*Primary Examiner*—Thomas Denion
*Assistant Examiner*—Binh Tran
*Attorney, Agent, or Firm*—Foley & Lardner

[57] ABSTRACT

For proper treatment of NOx released from NOx absorbent catalyst as well as HC and CO in exhaust gas, a measure of A/F of exhaust gas downstream of the NOx absorbent is used as the input to a feedback control loop. The feedback control loop alters a feedback correction factor (or coefficient) of a fuel control command applied to each fuel injector in such a direction to decrease a deviation of the actual A/F input from a target A/F (stoichiometry or rich) When the measure of A/F has switched the side to rich, a measure of A/F of exhaust gas upstream of the NOx absorbent catalyst is used as the input to perform usual feedback control loop to maintain lean combustion mode.

27 Claims, 13 Drawing Sheets

INTERNAL COMBUSTION ENGINE WITH NOX ABSORBENT CATALYST

FIELD OF THE INVENTION

The present invention relates to an exhaust gas purifier for an internal combustion engine. More particularly, the invention relates to a system for controlling air-fuel ratio (A/F) of combustible charge to create environment optimum for purification process of nitrogen oxides (NOx) in an exhaust passageway, which has a catalytic converter that carries a NOx absorbent.

BACKGROUND OF THE INVENTION

JP-A 7-139397 discloses an internal combustion engine having an exhaust gas passageway in which a NOx absorbent is disposed. When an air-fuel ratio of exhaust gas upstream of the absorbent is greater than the stoichiometry (A/F), the absorbent absorbs NOx in the exhaust gas. When STOICH the air-fuel ratio is not greater than the stoichiometry, the absorbent releases NOx.

FIG. 13 illustrates schematically a target A/F command input into a closed fuel control loop of an internal combustion engine having a NOx absorbent catalyst and NOx emission in the exhaust gas upstream of the catalyst. It also illustrates an air-fuel ratio in the exhaust gas, namely, an exhaust gas air-fuel ratio, at an inlet of the converter (drawn by the fully drawn line) and an exhaust gas air-fuel ratio at an outlet of the converter (drawn by the broken line). In FIG. 13, the fully drawn curve shows NOx emission resulting from combustion during lean combustion mode. The NOx absorbent has a storage limit. If this storage limit is exceeded, NOx is not absorbed.

Usually, the engine load, engine speed, and air-fuel ratio are employed for a controller to determine whether or not the storage limit is accomplished. If the storage limit is about to be exceeded, the controller sets the target air-fuel ratio to the stoichiometry or rich side, i.e., $A/F \leq A/F_{STOICH}$, causing the absorbent to release NOx, subjecting the released NOx to reduction with HC and CO contained in the exhaust gas.

A change, in target air-fuel ratio, from the lean side to the stoichiometry or rich side causes separation of NOx and $O_2$ from the NOx absorbent, restraining the atmosphere within the absorbent from becoming rich in air-fuel ratio due to the presence of separated $O_2$. The overabundance of $O_2$ oxidizes HC and CO, within the absorbent, which serve to purify NOx. Thus, the separated NOx is not purified at a satisfactory rate and discharged as it is out of the catalytic converter.

For purification of NOx, it would be desirable to accelerate the rate at which the exhaust gas within the converter becomes rich by giving rich spike in air-fuel ratio of the combustible charge.

The maximum amount by which a NOx absorbent can absorb NOx and $O_2$ storage capacity of the absorbent gradually decrease over extended period of time, thus, it would pose a problem of increased emission of HC and CO if the amount of rich spike were left unaltered cover the whole life of the NOx absorbent.

Besides, appropriately adjusting, in amount, rich spike proves to be an insufficient solution to the problem that NOx may leave the absorbent unpurified. This problem cannot be solved by increased amount of rich spike.

An object of the present invention is to provide a system for controlling air-fuel ratio of combustible charge, creating environment optimum for purification process of NOx in an exhaust passageway, which has a catalytic converter that carries a NOx absorbent, over the whole life of the NOx absorbent.

SUMMARY OF THE INVENTION

According to the present invention, there is provided an internal combustion engine system comprising:

a cylinder;

an intake passageway for admission of intake air into said cylinder;

a fuel infector for admission of fuel in said cylinder in response to a fuel control command;

an exhaust passageway for receiving exhaust gas resulting from combustion of combustible charge in said cylinder;

a NOx absorbent catalyst, disposed in said exhaust passageway, which absorbs nitrogen oxides (NOx) when air-fuel ratio of exhaust gas is on the lean side of the stoichiometry and releases NOx for reduction treatment when air-fuel ratio is at the stoichiometry or on the rich side; and a controller for generating said fuel control command, wherein said controller includes a temporary enrichment control to alter said fuel control command to temporarily enrich air-fuel ratio of exhaust gas for facilitating the release of NOx from said NOx absorbent catalyst, wherein said controller is operable to initiate said temporary enrichment control for facilitating the release of NOx from said NOx absorbent catalyst, and wherein, after said temporary enrichment control has been initiated, said controller is operable to monitor progress of enrichment of air-fuel ratio of exhaust gas in response to a measure of air-fuel ratio of exhaust gas downstream, with respect to flow of exhaust gas within said exhaust passageway, of said NOx absorbent catalyst.

DESCRIPTION OF THE PREFERRED EMBODIMENTS

Figure 1:
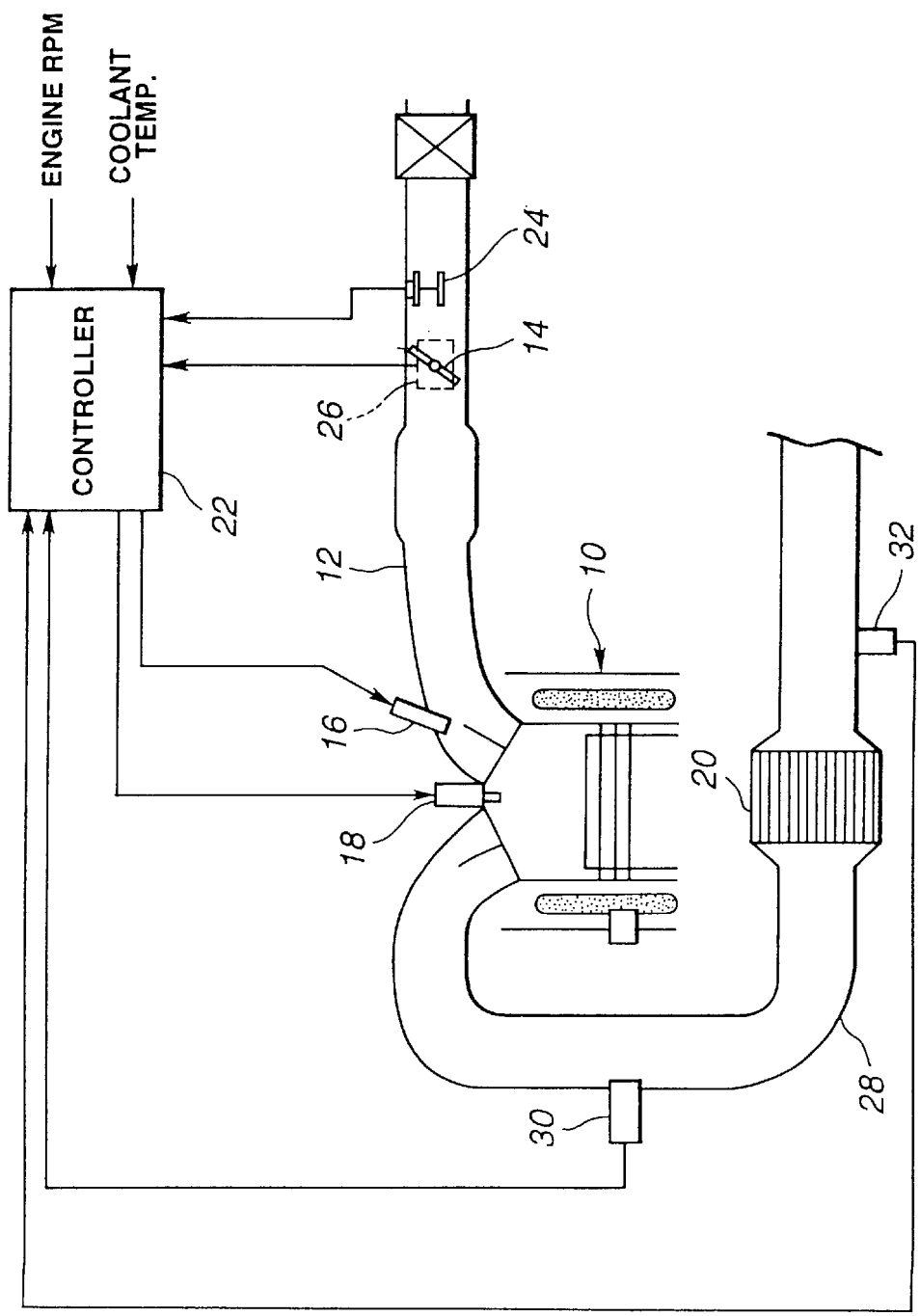
FIG. 1 illustrates hardware of a system according to the present invention.

Referring to FIG. 1, the reference numeral 10 denotes an internal combustion engine, which has an intake passageway 12 including a throttle valve 14. In operation, the throttle valve 14 meters flow rate of air admitted to cylinders of the engine 10. In its induction phase, a cylinder draws in air to be mixed with fuel injected by a fuel injector 16 to form a combustible charge. The fuel injector 16 may direct a jet of fuel into an intake port of each cylinder or directly into the cylinder.

A spark produced by a spark plug 18 ignites the combustible charge in the cylinder for combustion. Exhaust gas resulting from the combustion is purified by a NOx absorbent catalyst 20 and discharged into the ambient atmosphere.

The absorbent catalyst 20, which may be named NOx absorbing type three-way catalyst, can absorb NOx within exhaust gas when exhaust air-fuel ratio is not greater than the stoichiometry (or equal to the stoichiometry or rich). With exhaust air-fuel ratio being greater than the stoichiometry (or lean), it releases the absorbed NOx for reduction process by three-way catalyst layer.

A controller 22 manages injection timing and duration by the fuel injector 16 and spark timing by the spark plug 18. The controller 22 may include a digital microcomputer containing such generally-known components as a central processing unit (CPU), a read only memory (ROM), a random access memory (RAM) and an input/output interface circuit (I/O). The controller 22 generates a fuel injection signal (an injection pulse) for fuel injector 16 and a spark signal for spark plug 18 (power transistor).

In the process of calculating the fuel injection signal, the controller 22 determines a target air-fuel ratio for engine operating conditions and fuel injection quantity (injection pulse width) needed to create combustible charge having the target air-fuel ratio. The controller 22 can set, as the target air-fuel ratio, a lean air-fuel ratio.

The controller 22 inputs information of variables representing the engine operating conditions from various sensors. The sensors include an airflow meter 24 for detection of intake airflow rate (air quantity), and a throttle sensor 26 for detection of opening degree of the throttle valve 14, Exposed to an exhaust passageway 28 are a first and a second A/F sensors 30 and 32. The first A/F sensor 30 is disposed upstream of the NOx absorbent catalyst 20 for detection of exhaust air-fuel ratio. The second A/F sensor 32 is disposed downstream of the NOx absorbent catalyst 20 for detection of exhaust air-fuel ratio. The controller 22 in puts information of air-fuel ratio of the exhaust gas upstream and downstream of the NOx absorbent catalyst 20 from the first and second A/F sensors 30 and 32. The controller 22 inputs information of engine speed (RPM) and coolant temperature from a crankshaft angle sensor and a coolant temperature sensor, not shown.

The first and second A/F sensors 30 and 32 are each a sensor for detection of exhaust air-fuel ratio based on oxygen concentration within exhaust gas, which sensor may be a stoichiometry sensor for detection of the stoichiometry or a wide range air-fuel ratio sensor for detection of exhaust A/F over a wide range.

The control scheme performed by the controller 22 may be divided into a first air-fuel ratio (A/F) feedback control loop and a second air-fuel ratio (A/F) feedback control loop.

The actual air-fuel ratio from the first A/F sensor 30 is input to the first A/F feedback control loop. According to the first A/F feedback control loop, the fuel injection quantity is corrected in such a direction as to decrease a deviation of the actual air-fuel ratio from a target air-fuel ratio toward zero. An A/F feedback correction coefficient $\alpha$ (alpha,) that is used in correcting the fuel injection quantity is set, for example, by proportional integral (PI) control.

Immediately after the target air-fuel ratio has changed from lean air-fuel ratio and the stoichiometry or rich air-fuel ratio, the second A/F feedback control loop come to play a role instead of the first A/F feedback control loop. The actual air-fuel ratio from the second A/F sensor 32 is input into the second A/F feedback control loop. According to the first A/F feedback control loop, the fuel injection quantity is corrected in such a direction as to decrease a deviation of the actual air-fuel ratio from a target air-fuel ratio toward zero.

Figure 2:
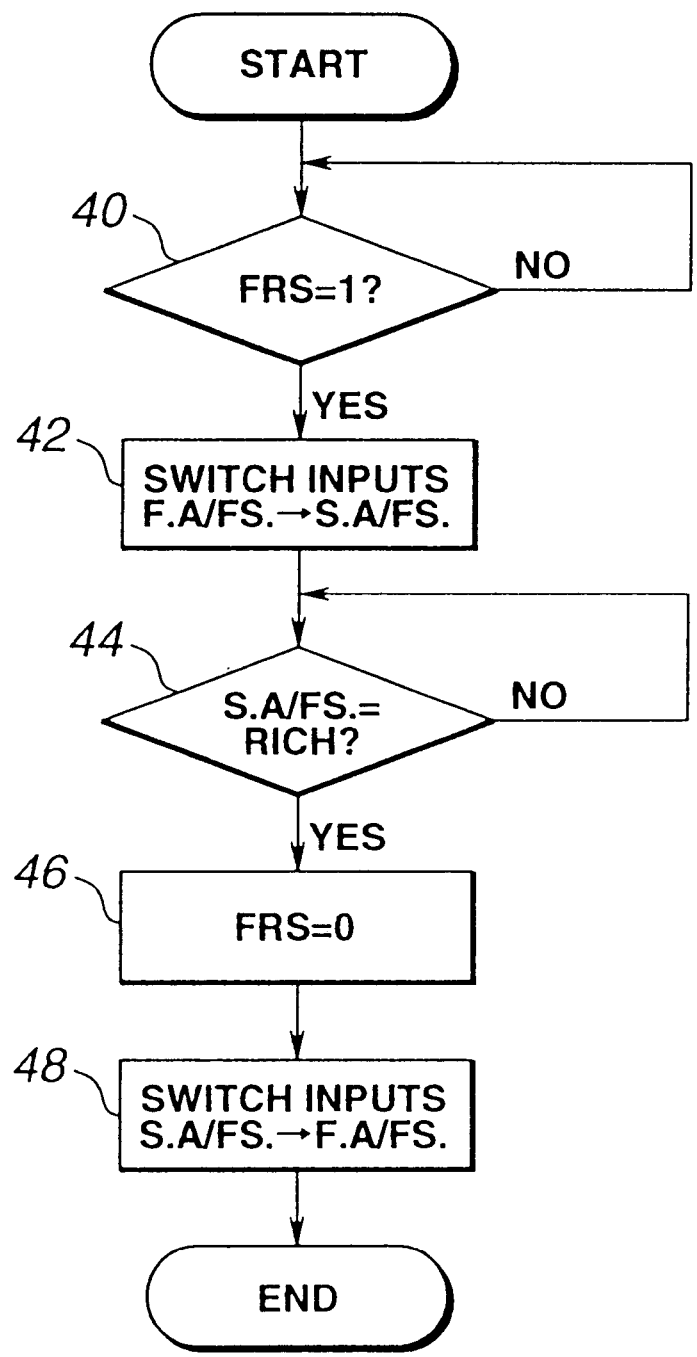
FIG. 2 is a flow chart illustrating a control routine of a preferred implementation of the present invention.

The flow chart of FIG. 2 illustrates a control routine to determine the initiation and termination of the second A/F feedback control loop.

In step 40, the controller 22 determines whether or not a flag FRS is set The controller 22 manages the flag FRS in another control routine, not shown, and sets the flag FRS when predetermined conditions are met.

The NOx absorbent catalyst 20 absorbs NOx when exhaust air-fuel ratio is lean, and releases the absorbed NOx when exhaust air-fuel ratio is stoichiometry or rich. If the target air-fuel ratio switches the setting from lean to the stoichiometry or rich, the NOx absorbent catalyst 20 releases NOx. Thus, the controller 22 sets the flag FRS under this condition.

Usually, operating conditions, which may be represented by operator power demand, engine load, and engine speed, determine when to shift the target air-fuel ratio from lean to the stoichiometry or rich. If it determines that the NOx absorbed by the absorbent catalyst 20 is about to reach the limit, the controller 22 initiates a temporary enrichment control for the release of NOx and purification thereof. If this is the case, the controller 22 sets the flag FRS.

If, in step 40, the flag FRS is reset and thus equal to 0 (zero), the routine returns to this step 40. If, in step 40, the flag FRS=1, the routine proceeds to step 42 where the controller 22 switches inputs from the first A/F sensor 30 to the second A/F sensor 32. Immediately after having determined first that FRS=1, the controller 22 continues to use the actual A/F from the second A/F sensor 32 as the input, thus rendering the second A/F feedback control loop inoperable. According to the second A/F feedback control loop, the fuel injection quantity is varied in such a direction as to decrease a deviation of the actual air-fuel ratio from the second A/F sensor 32 from the target air-fuel ratio that has been set to the stoichiometry or rich. The exhaust air-fuel ratio downstream of the absorbent catalyst 20 is adjusted towards the stoichiometry or rich setting. The controller 22 performs the second A/F feedback control loop until it determines, in step 44, that the second A/F sensor 32 switches the sides from lean to rich. In step 44, the controller 22 determines whether or not the second A/F sensor 32 has changed from the lean side to the rich side. In this example, the second A/F sensor 32 is of the stoichiometry type, if a so-called wide range A/F sensor is employed as the second A/F sensor 32, the statement of the interrogation in step 44 may read that "Has the predetermined target A/F been reached?"

If the interrogation in step 44 results in affirmative, the routine proceeds to step 46 where the controller 22 resets the flag FRS. In the next step 48, the controller 22 switches the inputs from second A/F sensor 32 to first A/F sensor 30.

Figure 3:
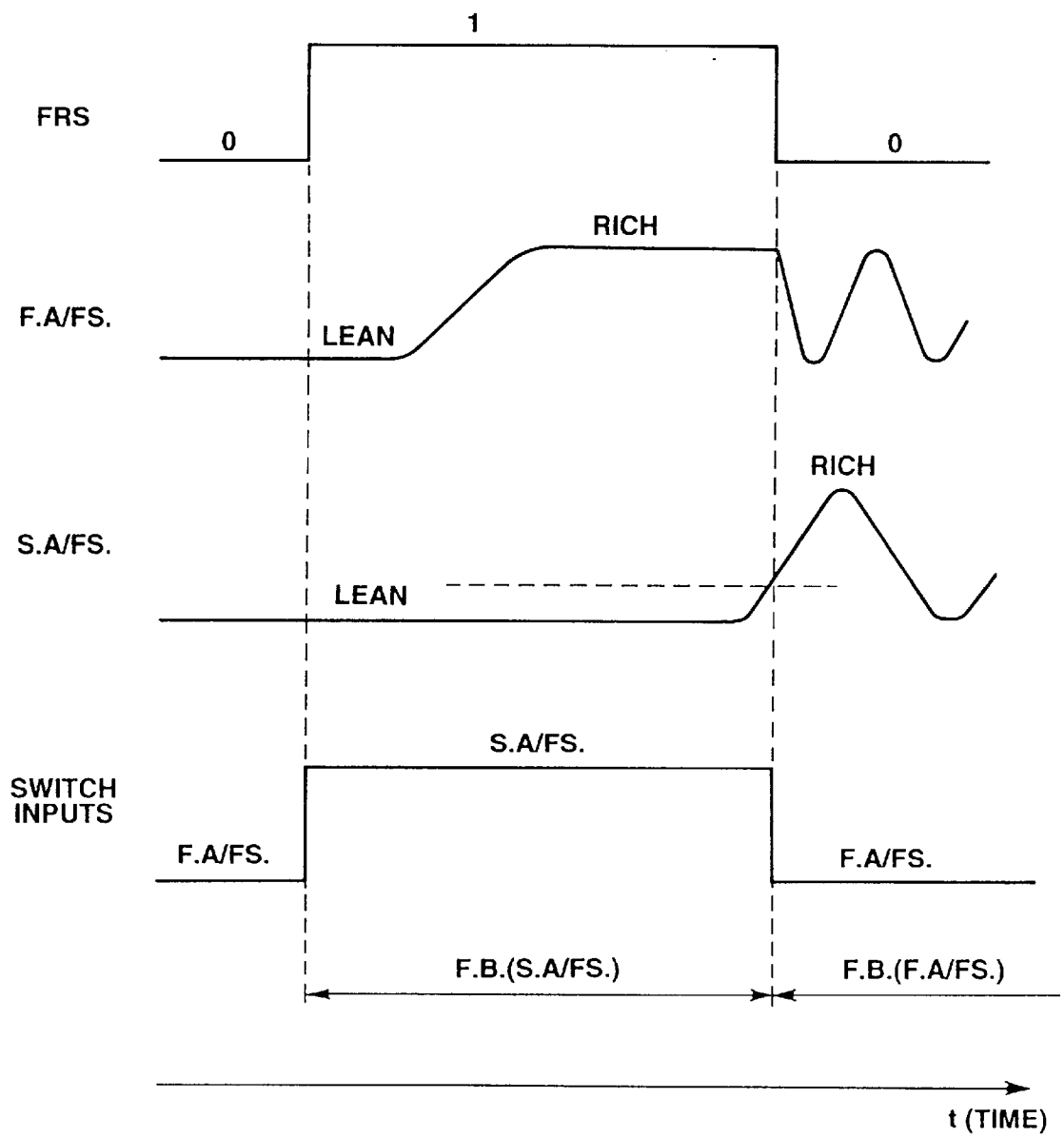
FIG. 3 illustrates a target air-fuel ratio input command and system response.

FIG. 3 illustrates the response of exhaust air-fuel ratio at the first A/F sensor 30 and exhaust air-fuel ratio at the second A/F sensor 32 upon and after the controller 22 sets the flag FRS.

In FIG. 3, at a moment when the target air-fuel ratio changes to the stoichiometry or rich and the controller 22 sets the flag FRS, the controller 22 switches the inputs from the first A/F sensor 30 to the second A/F sensor 32. Then, the controller 22 initiates the feedback control loop using the actual air-fuel ratio from the second A/F sensor 32 as the input. In other words, the fuel injection quantity increases until the second A/F sensor 32 switches the sides from lean to rich.

The first A/F sensor 30 switches the sides from lean to rich at relatively early stage. But, the second A/F sensor 32 remains on the lean side upon the switching of the first A/F sensor 30 owing to the separated NOx and $O_2$ from the NOx absorbent catalyst 20. Thus, the fuel injection quantity continues to increase after the first A/F sensor 30 has switched the sides to rich, creating a so-called "rich spike." This rich spike shortens time required for the second A/F sensor 32 to switch the sides from lean to rich. Thus, the time required for the exhaust air-fuel ratio within the NOx absorbent catalyst 20 to switch the sides to rich has been shortened.

The rich spike has proved to be effective in processing NOx released by the NOx absorbent catalyst 20, Thus, if the inside of the NOx absorbent catalyst 20 is quickly switched to the rich side, effective reduction of NOx is expected.

Increase of fuel infection quantity of the rich spike is terminated upon the second A/F sensor 32 switching the sides to rich. This is advantageous in suppressing excessive increase in fuel injection quantity for rich spike even after the NOx absorbing limit and $O_2$ storage limit drop over extended period of use of the NOx absorbent catalyst 20.

In FIG. 3, upon or immediately after the second A/F sensor 32 has switched the sides to rich, the controller 22 renders the first A/F feedback control loop operable and second A/F feedback control loop inoperable. In other words, the controller 22 initiates the A/F feedback control to being the actual exhaust air-fuel ratio at the first A/F sensor 30 into agreement with the stoichiometry.

Figure 4:
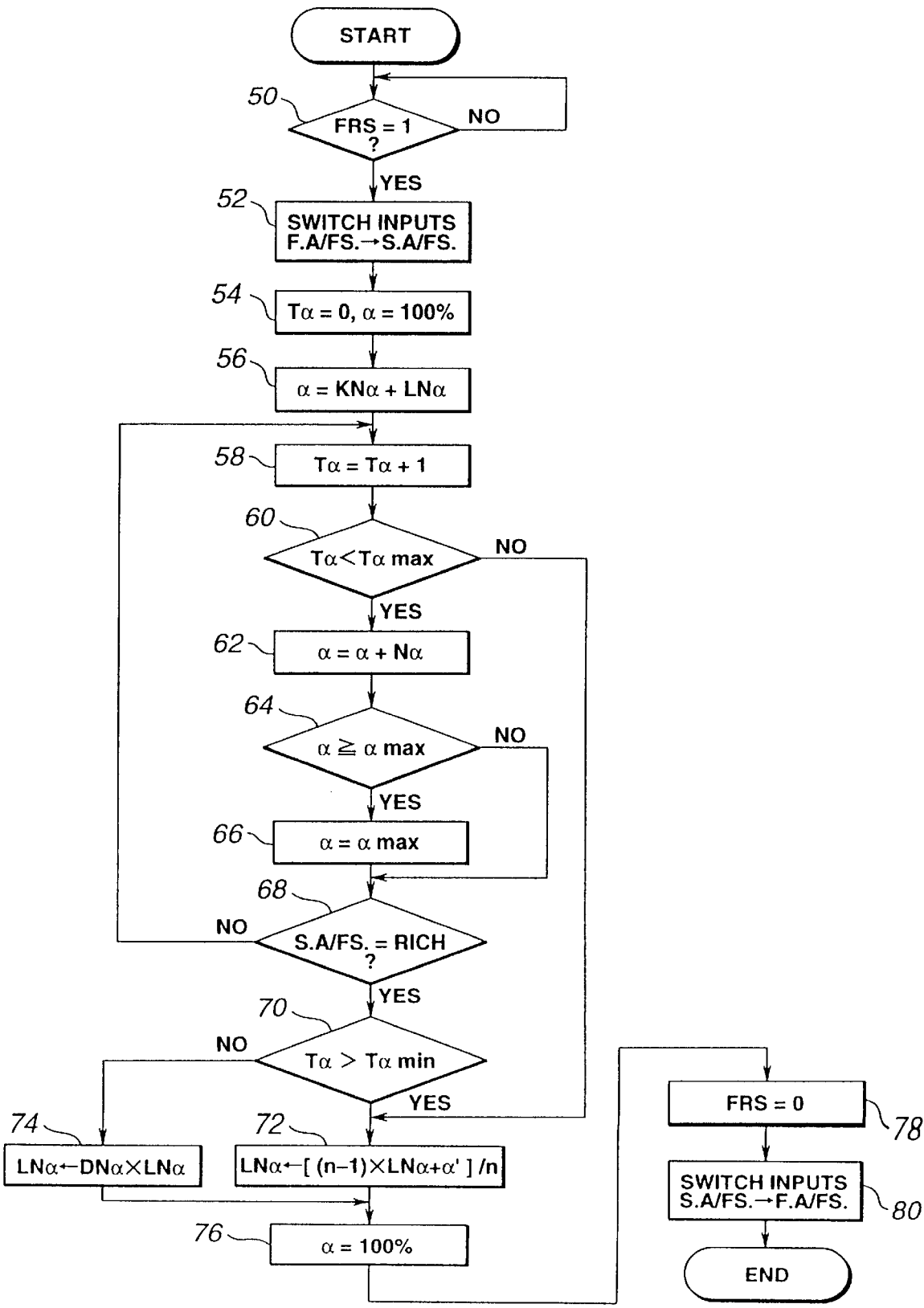
FIG. 4 is a flow chart illustrating a control routine of a second preferred implementation of the present invention.

The flow chart of FIG. 4 illustrates the preferred implementation of the present invention.

In step 50, the controller 22 determines whether or not the flag FRS is set. Immediately after the flag FRS has been set (=1), the control routine proceeds from step 50 to step 52.

In step 52, the controller 22 switches the inputs from the first A/F sensor 30 to the second A/F sensor 32. Then, the routine proceeds to step 54.

In step 54, the controller 22 resets or clear timer $T_\alpha$ ($T_\alpha=0$) and resets an A/F feedback correction coefficient $\alpha$ equal to an initial value of 100%. The time $T_\alpha$ counts a period of time over which the second A/F feedback control loop, which uses the second A/F sensor 32 as its input, continues to proceed. The feedback correction coefficient $\alpha$ is used as an operation amount for correcting the fuel injection quantity.

In the next step 56, the A/F feedback correction coefficient $\alpha$ is given by the following equation, $$\alpha = KN_\alpha + LN_\alpha \quad (1).$$

where:
$KN_\alpha$ is constant $LN_\alpha$ is a value resulting from learning a value of $\alpha$ upon the second A/F sensor 32 switching the sides to rich.

After setting the initial value as the feedback correction coefficient $\alpha$ (see FIG. 5), the control routine proceeds to step 58.

In step 58, the controller 22 increments the timer $T_\alpha$. In step 60, the controller 22 determines whether $T_\alpha$ is less than a maximum value $T_{max}$.

If, in step 60, $T_\alpha$ is less than $T_{max}$, the routine proceeds to step 62. In step 62, the controller 22 increases the correction coefficient $\alpha$ by an increment $N_\alpha$. Then, the routine proceeds to step 64.

Figure 5:
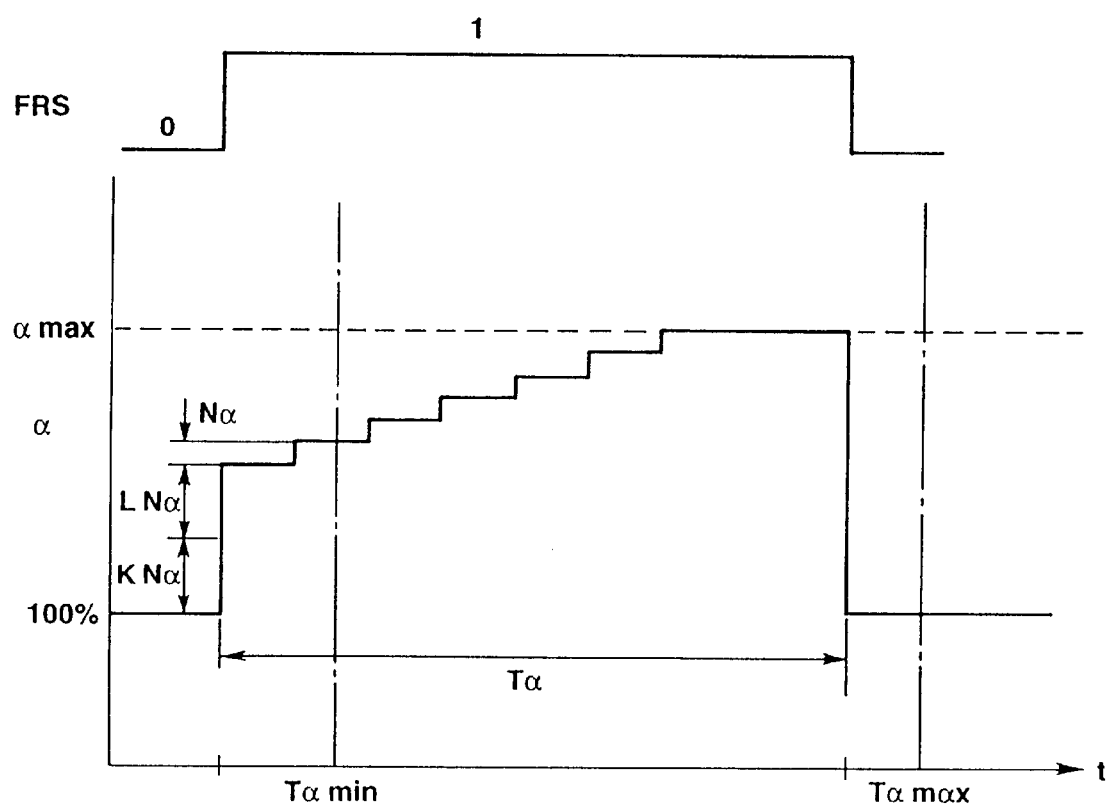
FIG. 5 illustrates a target air-fuel ratio input command and A/F sensor output response.

In step 64, the controller 22 determines whether or not the coefficient $\alpha$ has exceeded a predetermined maximum value $\alpha_{max}$ (refer to FIG. 5). If this is the case, the routine proceeds to step 66. In step 66, the controller 22 sets the maximum value $\alpha_{max}$ as the coefficient $\alpha$. Owing to proceeding along the steps 64 and 66, excessive increase in fuel injection quantity can be avoided. In other words, occurrence of excessive rich spike is prevented.

If desired, the integral control in steps 62, 64 and 66 may be eliminated. In this case, the coefficient $\alpha$ remains at the value that has been set in step 56.

In step 68, the controller 22 determines whether or not the second A/F sensor 32 has switched the sides to rich. If this is the case, the controller 22 determines that rich spike requested has occurred and proceeds to render the first A/F feedback control operable.

After step 68, the routine proceeds to step 70. In step 70, the controller 22 determines whether or not the timer $T_\alpha$ has exceeded a predetermined minimum value $T_{\alpha min}$.

Suppose that the second A/F sensor 32 has switched the sides to rich after timer $T_\alpha$ has exceeded the minimum value $T_{\alpha min}$. In this case, the routine proceeds from step 70 to step 72.

In step 72, the controller 22 updates the value resulting from learning $LN_\alpha$ with $[(n-1) \times LN_\alpha + \alpha']/n$, where $\alpha'$ is a value of the correction coefficient $\alpha$ upon the second A/F sensor 32 switching the sides to rich, and n is a predetermined weighing coefficient.

Updating $LN_\alpha$ in this manner will provide an appropriate value, as a change immediately after the second A/F sensor 32 has replaced the first A/F sensor 30, which is required for causing the second A/F sensor 32 to switch the sides to rich.

If desired, values resulting from learning operation upon switching the sides to rich may be stored against various combinations of values of engine load and values of engine speed If, in step 60, the controller 22 determines that timer $T_\alpha$ has exceeded $T_{\alpha max}$, the routine proceeds to step 72 for updating $LN_\alpha$ by learning operation. In this case, $\alpha'$ is a value of the correction coefficient $\alpha$ upon timer $T_\alpha$ having exceeded $T_{\alpha max}$.

If timer $T_\alpha$ has exceeded $T_{\alpha max}$, the routine proceeds to step 72 and then to steps 76, 78 and 80 and the controller 22 renders the first A/F feedback control loop operable without waiting for the second A/F sensor 32 to switch the sides to rich. This is where the second A/F feedback control loop is terminated prior to accomplishing the requested result.

If in step 70, the controller 22 determines that timer $T_\alpha$ has failed to exceed $T_{\alpha min}$, the routine proceeds to step 74. In step 74, the controller 22 updates the value $LN_\alpha$ with $DN_\alpha \times LN_\alpha$, where $DN_\alpha$ is a coefficient and less than 1 (one). This is where the valse $LN_\alpha$ is subjected to decrement. If the period of time required for the second A/F sensor 32 to switch the sides to rich is less than $T_{\alpha min}$, the value $LN_\alpha$ is decreased for elongation of the period of time toward $T_{\alpha min}$ during the subsequent operation cycle. This causes the second A/F sensor 32 to switch the sides to rich with an appropriate response for treatment of NOx.

After step 72 or 74, the routine proceeds to step 76. In step 76, the controller 22 resets the correction coefficient α is equal to the initial value of 100%. In the next step 78, the controller 22 resets the fag FRS equal to 0 (zero). Then, in step 80, the controller 22 switches the inputs from the second A/F sensor 32 to the first Air sensor 30, Subsequently, the controller 22 continues to perform the first A/F feedback control loop.

According to the above-discussed control scheme illustrated in FIG. 4, the atmosphere within the NOx absorbent catalyst 20 is quickly adjusted to an appropriate air-fuel ratio for treatment of NOx, which the catalyst 20 absorbed during the previous lean combustion mode. However, this is not effective in treating NOx that has escaped downstream of the catalyst 20. Besides, HC and CO owing to enrichment caused by the rich spike during the control scheme need to be treated.

Figure 6:
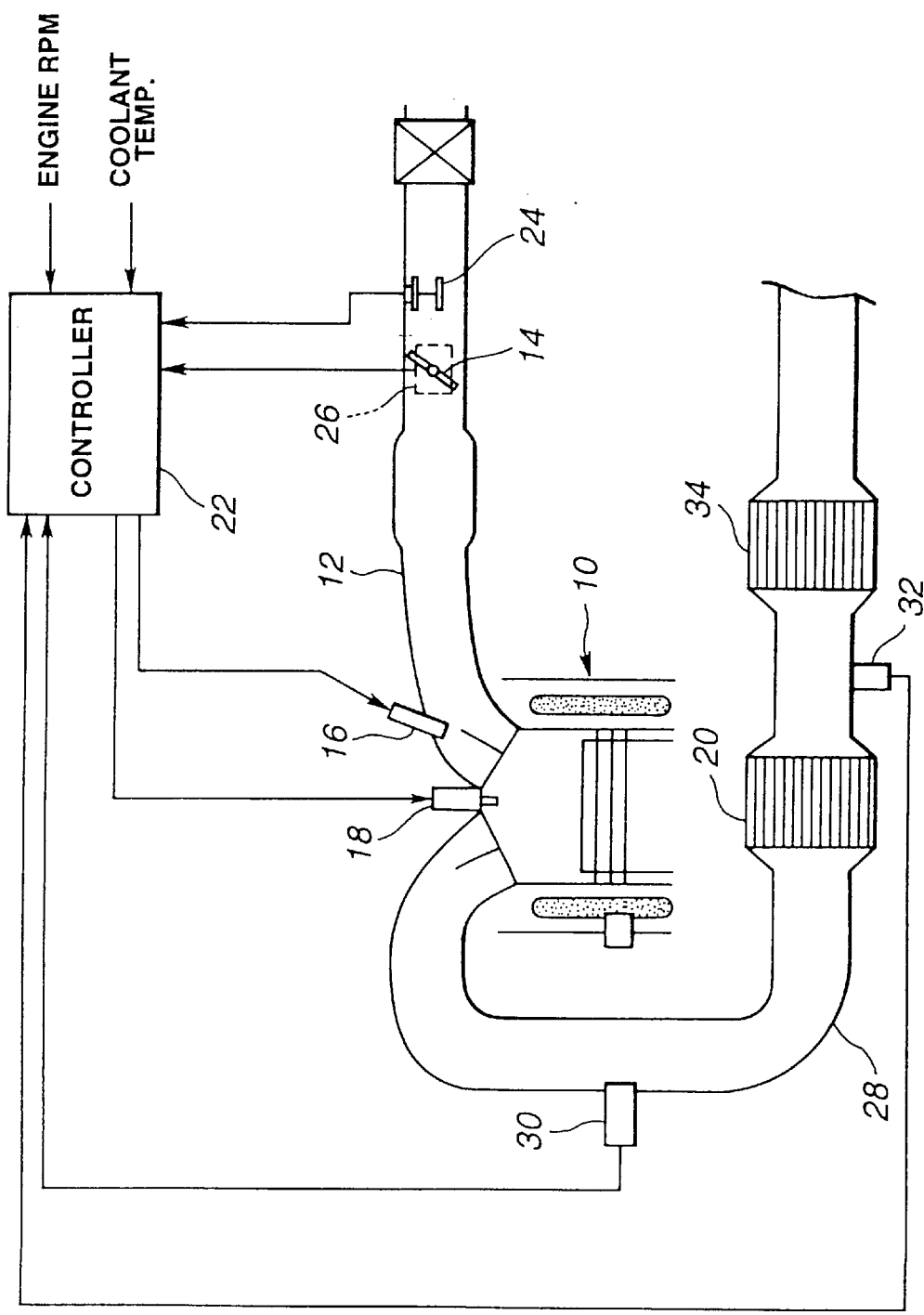
FIG. 6 illustrates another hardware of a system according to the present invention.

These problems may be solved by providing a three-way catalyst 34 in an exhaust passageway 28 downstream of a NOx absorbent catalyst 20 as ,Illustrated in FIG. 6.

Figure 7:
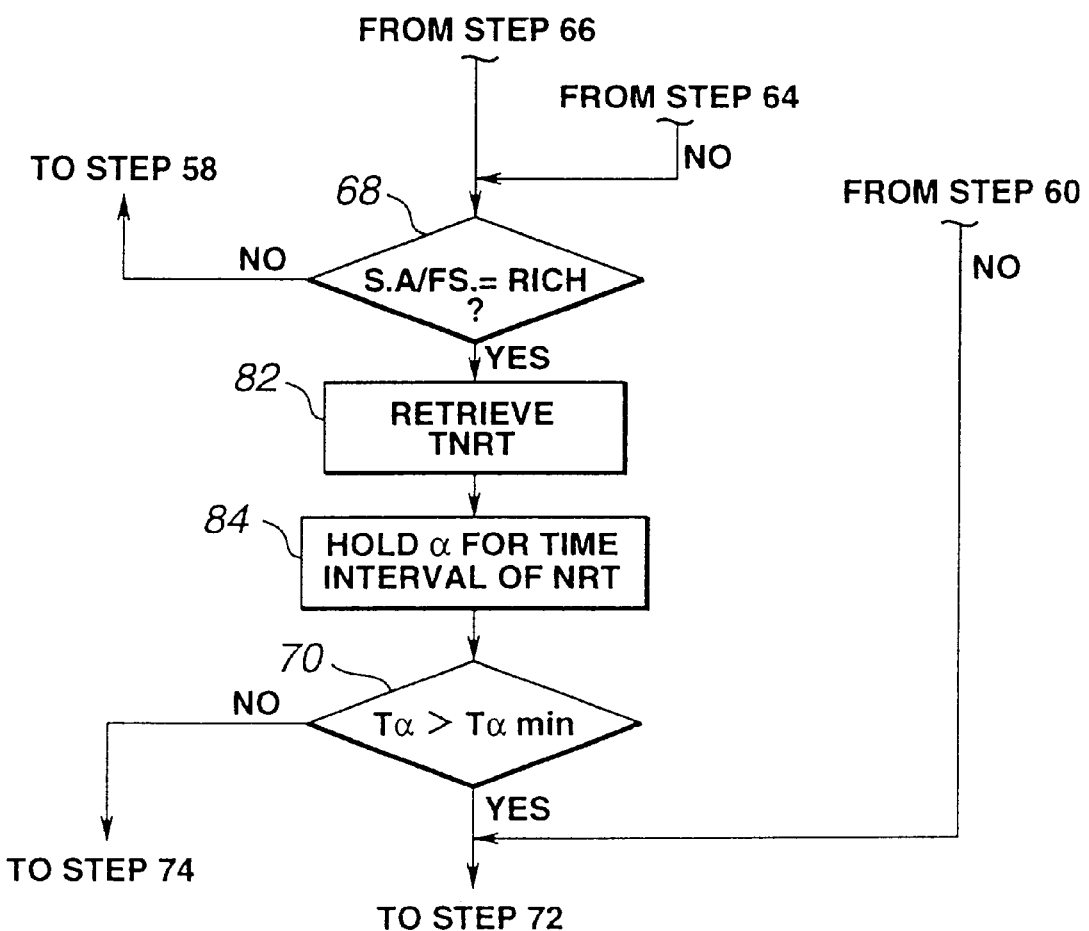
FIG. 7 is a flow chart illustrating a control routine of a third preferred implementation of the present invention.

FIG. 7 shows a portion of a flow chart illustrating a control routine intended also to facilitate treatment of toxic components of exhaust gas by the three-way catalyst 34. This flow chart is substantially the same as the flow chart of FIG. 4 except the insertion of two steps 82 and 84 downstream of the step 68 and upstream of the step 70 as shown in FIG. 7, This control routine is substantially the same as the control routine of FIG. 4 except as follows. The feedback correction coefficient α established when the second A/F sensor 32 switched the sides to rich is held for a time period, namely, a hold time NRT, that is a function of a time period, namely, a lean combustion time, over which the previous lean combustion mode continued.

Figure 8:
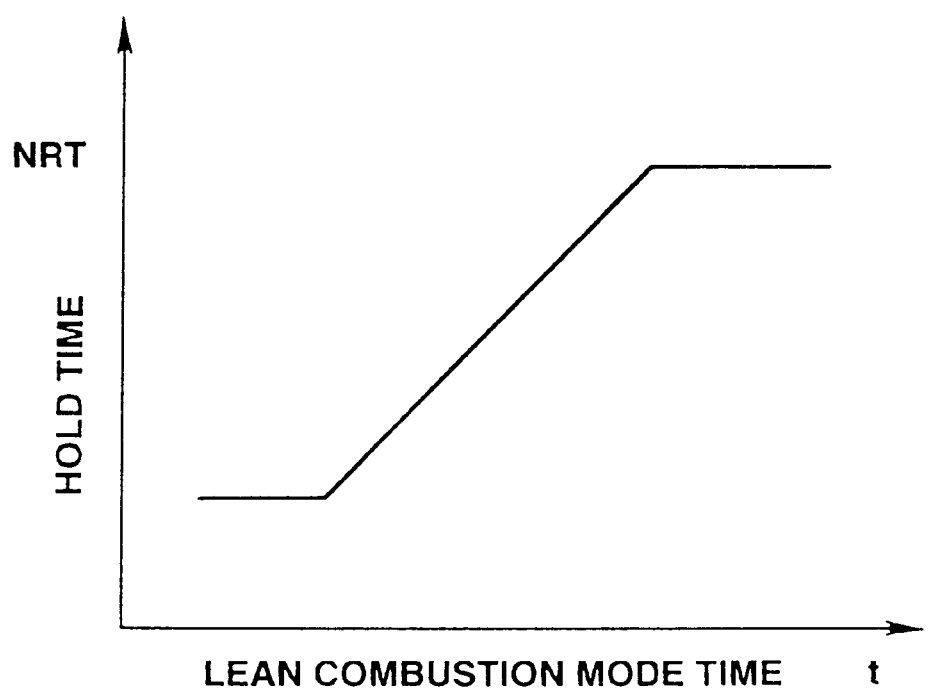
FIG. 8 illustrates preferred relation between holding time of A/F feedback correction efficiency and a period of time during which combustion with lean combustible mixture has continued.
Figure 9:
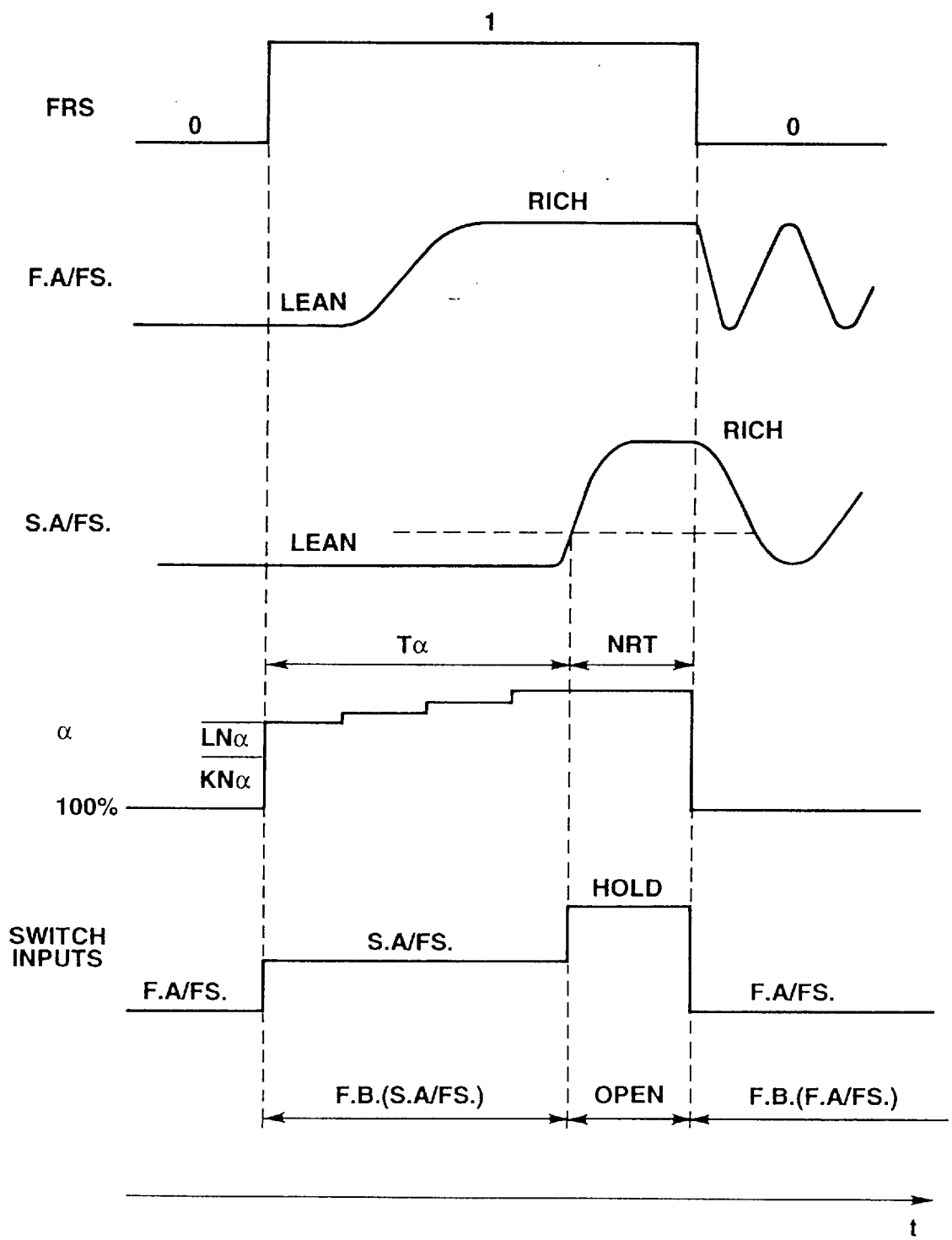
FIG. 9 illustrates a target air-fuel ratio input command and system response.

In FIG. 7, the control routine proceeds to step 82 after controller 22 determined, in step 68, that second A/F sensor 32 has switched the side to rich. In step 82, the controller 22 retrieves a table TRNT as illustrated in FIG. 8. The table TRNT illustrates experimentally determined relation between the hold time NRT and the lean combustion time. The controller 22 uses lean combustion time in performing a table look-up operation of the table TRNT to determine a value of NRT. In the next step 84, the controller 22 holds the correction coefficient α for time period of NRT. After elapse of the time period of NRT, the routine proceeds to the step 70. FIG. 9 illustrates clearly that the correction coefficient α established when the second A/F sensor 32 switched the sides to rich is held for NRT prior to returning to first A/F feedback control loop. This enrichment operation bring about a quick accomplishment of rich A/F within the three-way catalyst 34 for efficient purification of NOx discharged from the absorbent catalyst 20.

According to the control scheme illustrated in FIGS. 6 to 9, the table TRNT of FIG. 8 is referred to determine NRT over which the enrichment operation continues for quick enrichment of exhaust gas within the three-way catalyst 34. This open loop enrichment control may be replaced with a closed loop enrichment control as illustrated in FIGS. 10 to 12.

Figure 10:
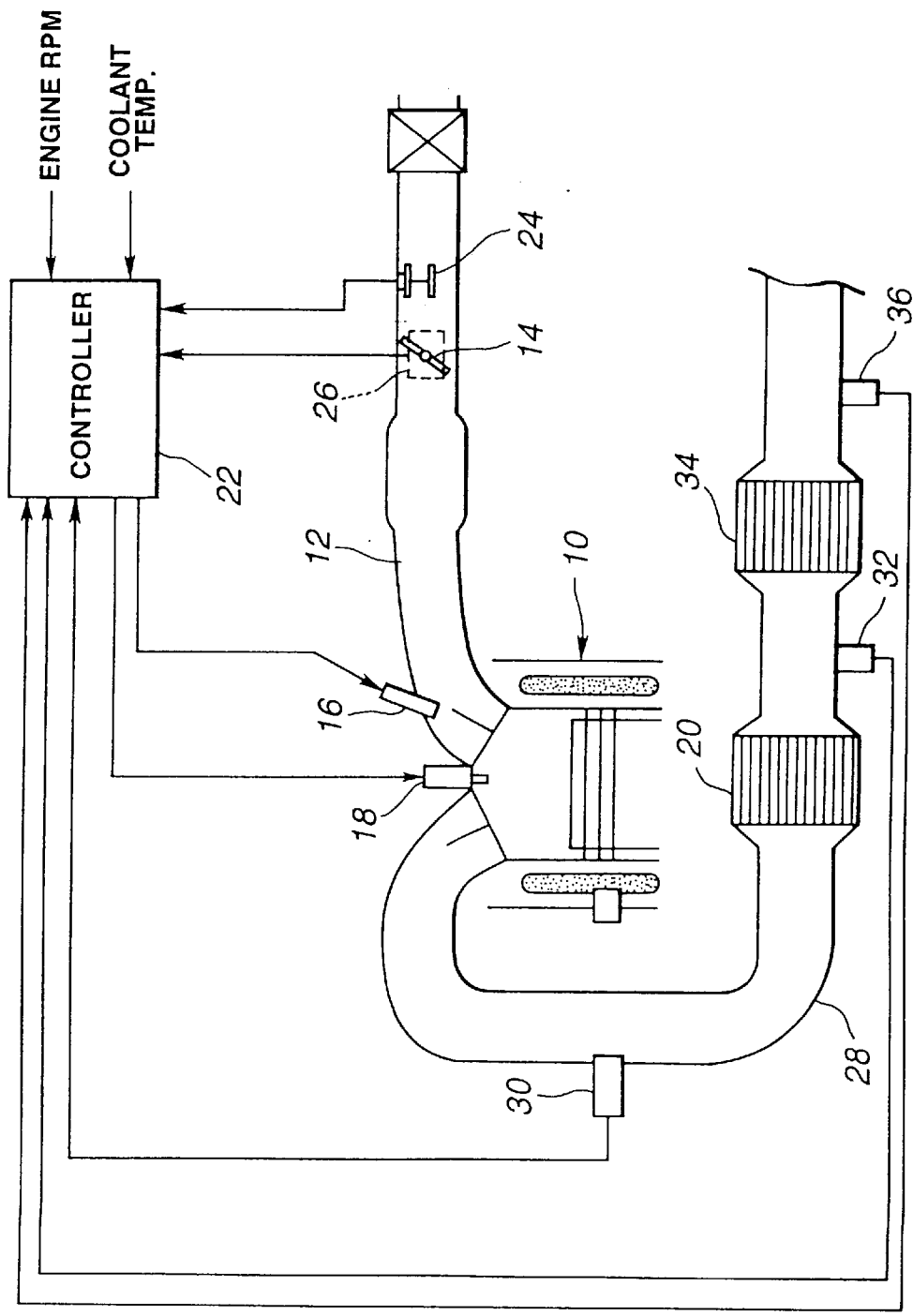
FIG. 10 illustrates still another hardware of a system according to the present invention.

FIG. 10 illustrates hardware. This hardware is different from that of FIG. 6 only the addition of a third A/F sensor 36 downstream of a three-way catalyst 34.

Figure 11:
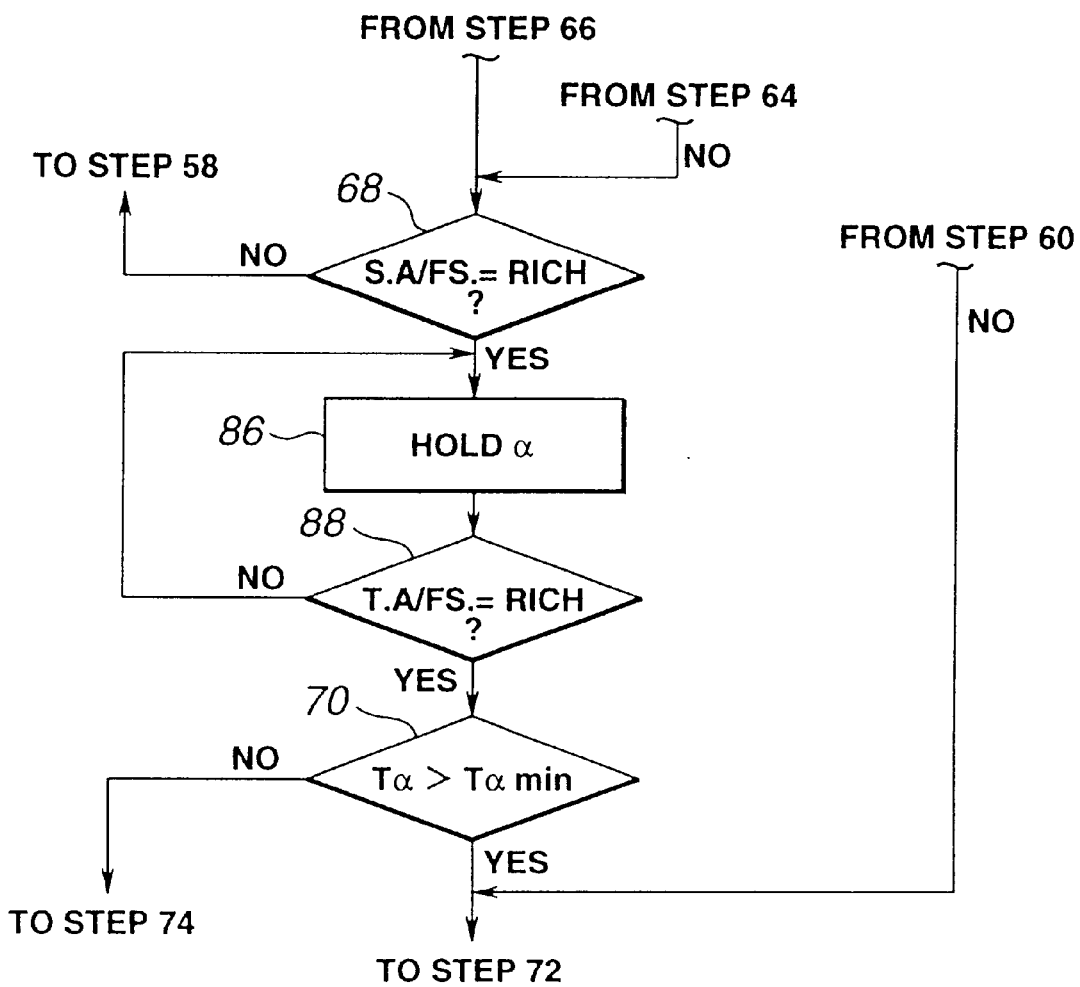
FIG. 11 is a flow chart illustrating a control routine of a fourth preferred implementation of the present invention.
Figure 12:
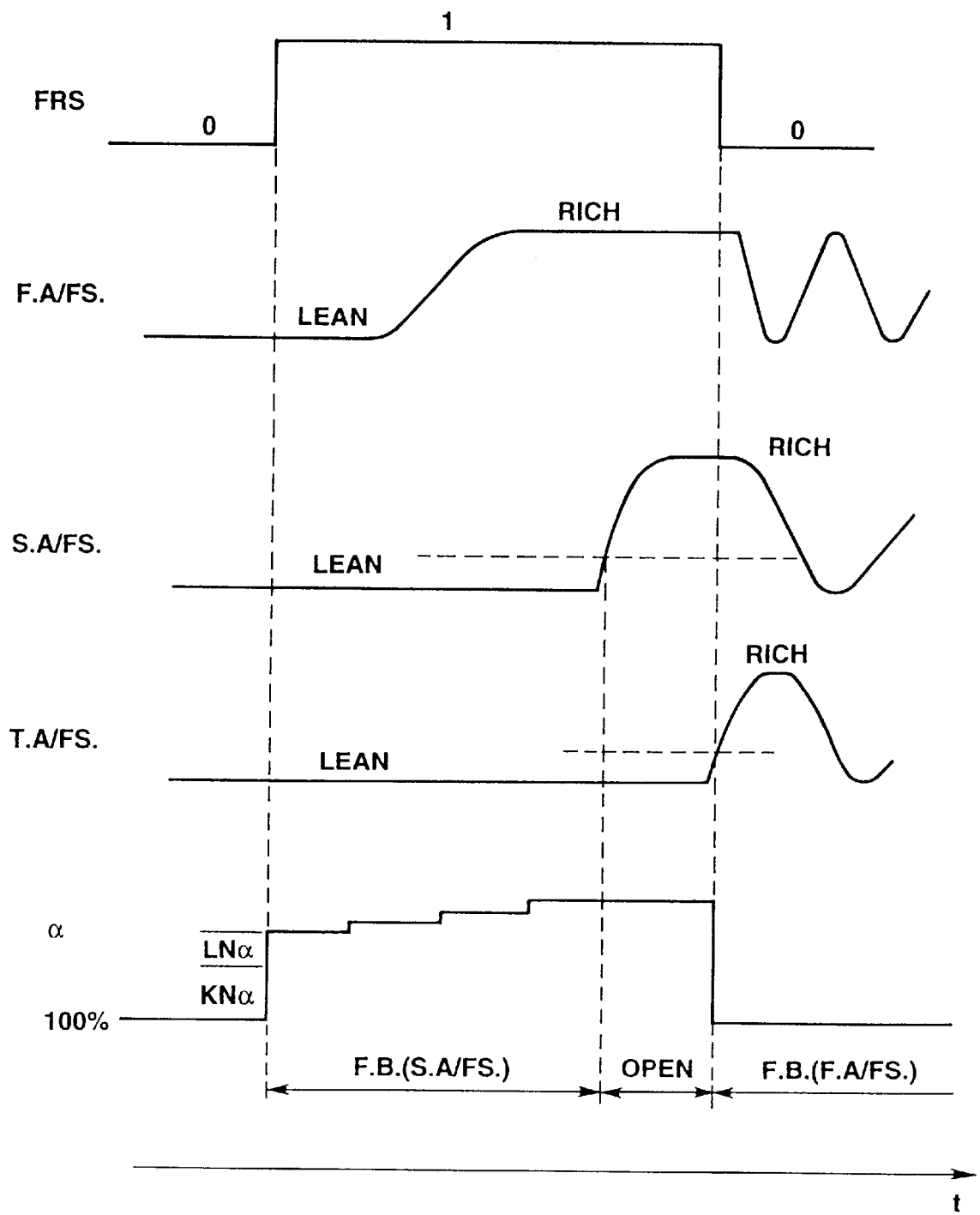
FIG. 12 illustrates a target air-fuel ratio input command and system response.
Figure 13:
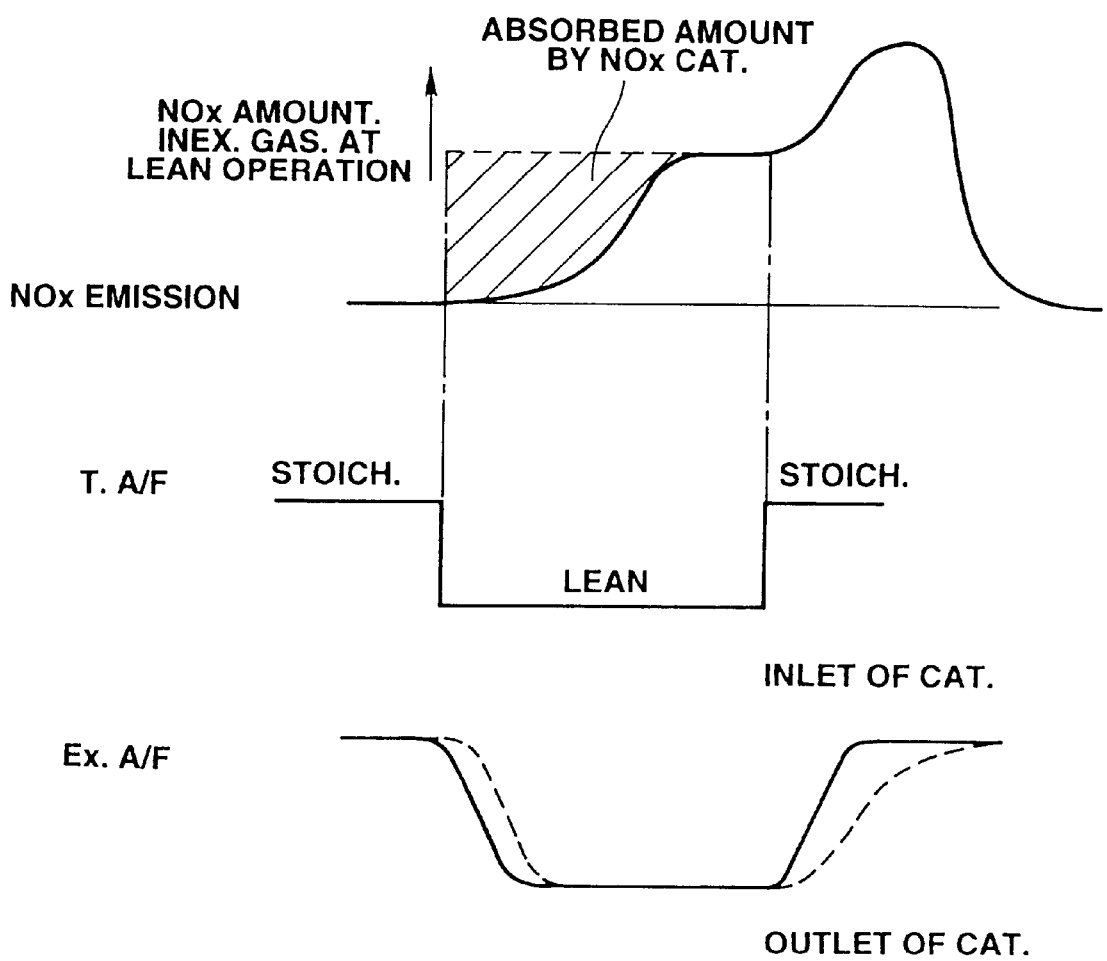
FIG. 13 illustrates schematically a target air-fuel ratio command input into a closed fuel control loop of an internal combustion engine having a NOx absorbent catalyst, and NOx emission in the exhaust gas upstream of the catalytic.

FIG. 11 shows a portion of a flow chart illustrating a control routine intended to perform the closed loop enrichment control to facilitate treatment of toxic components of exhaust gas by the three-way catalyst 34. This flow chart is substantially the same as the flow chart of FIG. 4 except tire insertion of two steps 86 and 88 downstream of the step 68 and upstream of the step 70 as shown in FIG. 11. This control routine is substantially the same as the control routine of FIG. 4 except as follows. The feedback correction coefficient α established when the second A/F sensor 32 switched the sides to rich is held until the third A/F sensor 36 switch the sides to rich.

In FIG. 11, the control routine proceeds to step 86 after controller 22 determined, in step 68, that second A/F sensor 32 has switched the side to rich. In step 86, the controller 22 holds the correction coefficient α. In the next step 88, the controller 22 determines whether or not the third A/F sensor 36 has switched the sides to rich. If this is not the case, the routine returns to step 86. If this is the case, the routine proceeds to the step 70. Thus, the correction coefficient α is held until determination in step 88 that the third A/F sensor 36 having switched the sides to rich. FIG. 12 illustrates clearly that the correction coefficient α established when the second A/F sensor 32 switched the sides to rich is held until third A/F sensor 36 will switch the sides to rich. This closed loop enrichment operation brings about a quick accomplishment of rich air-fuel ratio within the three-way catalyst 34 without prolonged rich spike.

What is claimed is:

1. An internal combustion engine system comprising:

a cylinder;

an intake passageway for admission of intake air into said cylinder;

a fuel injector for admission of fuel into said cylinder in response to a fuel control command;

an exhaust passageway for receiving exhaust gas resulting from combustion of combustible charge in said cylinder;

a NOx absorbent catalyst, disposed in said exhaust passageway, which absorbs nitrogen oxides (NOx) when air-fuel ratio of exhaust gas is on the lean side of the stoichiometry and releases NOx for reduction treatment when air-fuel ratio is at the stoichiometry or on the rich side; and a controller for generating said fuel control command, wherein said controller includes a temporary enrichment control to alter said fuel control command to temporarily enrich air-fuel ratio of exhaust gas for facilitating the release of NOx from said NOx absorbent catalyst, wherein said controller is operable to initiate said temporary enrichment control for facilitating the release of NOx from said NOx absorbent catalyst, and wherein, after said temporary enrichment control has been initiated, said controller is operable to alter said fuel control command in such a direction as to reduce a deviation of a measure of air-fuel ratio of exhaust gas downstream, with respect to flow of exhaust gas within said exhaust passageway, of said NOx absorbent catalyst from a predetermined value toward zero until said measure of air-fuel ratio of the exhaust gas switches from the lean side to the rich side, and to terminate said temporary enrichment control after said measure of air-fuel ratio of the exhaust gas has switched from the lean side to the rich side.

2. An internal combustion engine system comprising:

a cylinder;

an intake passageway for admission of intake air into said cylinder;

a fuel injector for admission of fuel into said cylinder in response to a fuel control command;

an exhaust passageway for receiving exhaust gas resulting from combustion of combustible charge in said cylinder;

a NOx absorbent catalyst, disposed in said exhaust passageway, which absorbs nitrogen oxides (NOx) when air-fuel ratio of exhaust gas is on the lean side of the stoichiometry and releases NOx for reduction treatment when air-fuel ratio is at the stoichiometry or on the rich side; and a controller for generating said fuel control command, wherein said controller includes a temporary enrichment control to alter said fuel control command to temporarily enrich air-fuel ratio of exhaust gas for facilitating the release of NOx from said NOx absorbent catalyst, wherein said controller is operable to initiate said temporary enrichment control for facilitating the release of NOx from said NOx absorbent catalyst, and wherein, after said temporary enrichment control has been initiated, said controller is operable to monitor progress of enrichment of air-fuel ratio of exhaust gas in response to a measure of air-fuel ratio of exhaust gas downstream, with respect to flow of exhaust gas within said exhaust passageway, of said NOx absorbent catalyst; and further comprising, a three-way catalyst disposed downstream, with respect to flow of exhaust gas within said exhaust passageway, of said NOx absorbent catalyst, and wherein, during said temporary enrichment control, said controller is operable to hold a correction factor of said fuel control command unaltered after said measure of air-fuel ratio of the exhaust gas has switched from the lean side to the rich side until said controller terminates said temporary enrichment control when a measure of air-fuel ratio of the exhaust gas downstream of said three-way catalyst switches from the lean side to the rich side.

3. An internal combustion engine system comprising:

a cylinder;

an intake passageway for admission of intake air into said cylinder;

a fuel injector for admission of fuel into said cylinder in response to a fuel control command;

an exhaust passageway for receiving exhaust gas resulting from combustion of combustible charge in said cylinder;

a NOx absorbent catalyst, disposed in said exhaust passageway, which absorbs nitrogen oxides (NOx) when air-fuel ratio of exhaust gas is on the lean side of the stoichiometry and releases NOx for reduction treatment when air-fuel ratio is at the stoichiometry or on the rich side; and a controller for generating said fuel control command, wherein said controller includes a temporary enrichment control to alter said fuel control command to temporarily enrich air-fuel ratio of exhaust gas for facilitating the release of NOx from said NOx absorbent catalyst, wherein said controller is operable to initiate said temporary enrichment control for facilitating the release of NOx from said NOx absorbent catalyst, and wherein, after said temporary enrichment control has been initiated, said controller is operable to monitor progress of enrichment of air-fuel ratio of exhaust gas in response to a measure of air-fuel ratio of exhaust gas downstream, with respect to flow of exhaust gas within said exhaust passageway, of said NOx absorbent catalyst; and further comprising, a three-way catalyst disposed downstream, with respect to flow of exhaust gas within said exhaust passageway, of said NOx absorbent catalyst, and wherein, during said temporary enrichment control, said controller is operable to hold said fuel control command unaltered for a predetermined period of time after said measure of air-fuel ratio of the exhaust gas has switched from the lean side to the rich side.

4. An internal combustion engine system comprising:

a cylinder;

an intake passageway for admission of intake air into said cylinder;

a fuel injector for admission of fuel into said cylinder in response to a fuel control command;

an exhaust passageway for receiving exhaust gas resulting from combustion of combustible charge in said cylinder;

a NOx absorbent catalyst, disposed in said exhaust passageway, which absorbs nitrogen oxides (NOx) when air-fuel ratio within exhaust gas is on the lean side of the stoichiometry and releases NOx for reduction treatment when air-fuel ratio is at the stoichiometry or on the rich side;

a first A/F sensor for obtaining a first measure of air-fuel ratio of exhaust gas upstream, with respect to flow of exhaust gas in said exhaust passageway, of said NOx absorbent catalyst;

a second A/F sensor for obtaining a second measure of air-fuel ratio of exhaust gas downstream, with respect to flow of exhaust gas in said exhaust passageway, of said NOx absorbent catalyst; and a controller for generating said fuel control command, said controller including a feedback control loop for altering a feedback correction factor of said fuel control command in such a direction as to decrease a deviation of an actual air-fuel ratio input from a target air-fuel ratio toward zero, wherein usually said controller uses said first measure of air-fuel ratio of exhaust gas as said actual air-fuel ratio input to said feedback control loop, wherein said controller includes a temporary enrichment control to temporarily enrich air-fuel ratio of exhaust gas for facilitating the release of NOx from said NOx absorbent catalyst, wherein said controller is operable to initiate said temporary enrichment control for facilitating the release of NOx from said NOx absorbent catalyst, wherein, after said controller has initiated said temporary enrichment control, said controller is operable to input said second measure of air-fuel ratio of exhaust gas to alter said fuel control command in such a direction as to reduce a deviation of said second measure of air-fuel ratio of exhaust gas from a predetermined value toward zero until said measure of air-fuel ratio of the exhaust gas switches from the lean side to the rich side, and to terminate said temporary enrichment control after said second measure of air-fuel ratio of the exhaust gas has switched from the lean side to the rich side.

5. An internal combustion engine system as claimed in claim 4, wherein said controller is operable to change said target air-fuel ratio from the lean side toward the rich side with respect to the stoichiometry upon initiation of said temporary enrichment control and to hold said target air-fuel ratio changed over said temporary enrichment control, and wherein said controller is operable to use said second measure of air-fuel ratio as said actual air-fuel ratio input to said feedback control loop instead of said first measure of air-fuel ratio after the initiation of said temporary enrichment control until said controller determines in response to said second measure of air-fuel ratio that said second A/F sensor has switched from the lean side to the rich side in response to said second measure of air-fuel ratio.

6. An internal combustion engine system as claimed in claim 5, wherein said controller is operable to update a leaning value of said feedback correction coefficient each time upon said determination by said controller that said second A/F sensor has switched from the lean side to the rich side during current execution by said controller of said temporary enrichment control, and uses said updated learning value of said correction coefficient in altering an initial value of said feedback correction coefficient for the subsequent execution by said controller of said temporary enrichment control.

7. An internal combustion engine system as claimed in claim 4, wherein said controller is operable to terminate said temporary enrichment loop upon elapse of a predetermined maximum value of time after said controller has initiated said temporary enrichment loop unless said controller determines in response to said second measure of air-fuel ratio that said second A/F sensor has switched from the lean side to the rich side.

8. An internal combustion engine system as claimed in claim 4, wherein said controller is operable to terminate said temporary enrichment control when said second measure of air-fuel ratio accomplishes a predetermined relation with a predetermined value.

9. An internal combustion engine system as claimed in claim 8, wherein said controller is operable to hold said target air-fuel ratio at the rich side over said temporary enrichment control.

10. An internal combustion engine system as claimed in claim 9, wherein said controller is operable to use said second measure of air-fuel ratio as said actual air-fuel ratio input to said feedback control loop over said temporary enrichment control.

11. An internal combustion engine system as claimed in claim 10, wherein said controller is operable to initiate said temporary enrichment control in response to operating conditions of the engine.

12. An internal combustion engine system as claimed in claim 4, wherein said controller measures a time taken for current execution of said temporary enrichment control and compares said measured time with a predetermined minimum value of time, and wherein said controller is operable to alter an initial setting of progress of enrichment for the subsequent execution of said temporary enrichment control in such a direction as to increase time required for the subsequent execution of said temporary enrichment control.

13. An internal combustion engine system as claimed in claim 12, wherein said controller is operable to terminate said temporary enrichment control when said second measure of air-fuel ratio accomplished a predetermined relation with a predetermined value.

14. An internal combustion engine system as claimed in claim 13, wherein said controller is operable to hold said target air-fuel ratio at the rich side over said temporary enrichment control.

15. An internal combustion engine system as claimed in claim 14, wherein said controller is operable to use said second measure of air-fuel ratio as said actual air-fuel ratio input to said feedback control loop over said temporary enrichment control.

16. An internal combustion engine system as claimed in claim 15, wherein said controller is operable to initiate said temporary enrichment control in response to operating conditions of the engine.

17. An internal combustion engine system as claimed in claim 12, wherein said controller is operable to hold said feedback correction coefficient unaltered for a predetermined period of time after said controller has determined that said second A/F sensor has switched from the lean side to the rich side during said temporary enrichment control.

18. An internal combustion engine system as claimed in claim 17, wherein said controller is operable to terminate said temporary enrichment control upon elapse of said predetermined period of time.

19. An internal combustion engine system comprising:
a cylinder;
an intake passageway for admission of intake air into said cylinder;
a fuel injector for admission of fuel into said cylinder in response to a fuel control command;
an exhaust passageway for receiving exhaust gas resulting from combustion of combustible charge in said cylinder;
a NOx absorbent catalyst, disposed in said exhaust passageway, which absorbs nitrogen oxides (NOx) when air-fuel ratio within exhaust gas is on the lean side of the stoichiometry and releases NOx for reduction treatment when air-fuel ratio is at the stoichiometry or on the rich side;
a first A/F sensor for obtaining a first measure of air-fuel ratio of exhaust gas upstream, with respect to flow of exhaust gas in said exhaust passageway, of said NOx absorbent catalyst;
a second A/F sensor for obtaining a second measure of air-fuel ratio of exhaust gas downstream, with respect to flow of exhaust gas in said exhaust passageway, of said NOx absorbent catalyst; and
a controller for generating said fuel control command, said controller including a feedback control loop for altering a feedback correction factor of said fuel control command in such a direction as to decrease a deviation of an actual air-fuel ratio input from a target air-fuel ratio toward zero,
wherein usually said controller uses said first measure of air-fuel ratio of exhaust gas as said actual air-fuel ratio input to said feedback control loop,
wherein said controller includes a temporary enrichment control to temporarily enrich air-fuel ratio of exhaust gas for facilitating the release of NOx from said NOx absorbent catalyst,
wherein said controller is operable to initiate said temporary enrichment control for facilitating the release of NOx from said NOx absorbent catalyst,
wherein, after controller has initiated said temporary enrichment control, said controller is operable to input said second measure of air-fuel ratio of exhaust gas to monitor progress of enrichment of air-fuel ratio of exhaust gas in response to said second measure of air-fuel ratio, wherein said controller is operable to change said target air-fuel ratio from the lean side toward the rich side with respect to the stoichiometry upon initiation of said temporary enrichment control and to hold said target air-fuel ratio changed over said temporary enrichment control, and wherein said controller is operable to use said second measure of air-fuel ratio as said actual air-fuel ratio input to said feedback control loop instead of said first measure of air-fuel ratio after the initiation of said temporary enrichment control until said controller determines in response to said second measure of air-fuel ratio that said second A/F sensor has switched from the lean side to the rich side in response to said second measure of air-fuel ratio, wherein said controller is operable to update a leaning value of said feedback correction coefficient each time upon said determination by said controller that said second A/F sensor has switched from the lean side to the rich side during current execution by said controller of said temporary enrichment control, and uses said updated learning value of said correction coefficient in altering an initial value of said feedback correction coefficient for the subsequent execution by said controller of said temporary enrichment control, and wherein said controller is operable to provide a reduced value as said updated value of said feedback correction coefficient upon determination by said controller that said second A/F sensor has switched from the lean side to the rich side before a predetermined minimum value of time passes after said controller has initiated said temporary enrichment control.

20. An internal combustion engine system comprising:

a cylinder;

an intake passageway for admission of intake air into said cylinder;

a fuel injector for admission of fuel into said cylinder in response to a fuel control command;

an exhaust passageway for receiving exhaust gas resulting from combustion of combustible charge in said cylinder;

a NOx absorbent catalyst, disposed in said exhaust passageway which absorbs nitrogen oxides (NOx) when air-fuel ratio within exhaust gas is on the lean side of the stoichiometry and releases NOx for reduction treatment when air-fuel ratio is at the stoichiometry or on the rich side;

a first A/F sensor for obtaining a first measure of air-fuel ratio of exhaust gas upstream, with respect to flow of exhaust gas in said exhaust passageway, of said NOx absorbent catalyst;

a second A/P sensor for obtaining a second measure of air-fuel ratio of exhaust gas downstream, with respect to flow of exhaust gas in said exhaust passageway, of said NOx absorbent catalyst; and a controller for generating said fuel control command, said controller including a feedback control loop for altering a feedback correction factor of said fuel control command in such a direction as to decrease a deviation of an actual air-fuel ratio input from a target air-fuel ratio toward zero, wherein usually said controller uses said first measure of air-fuel ratio of exhaust gas as said actual air-fuel ratio input to said feedback control loop, wherein said controller includes a temporary enrichment control to temporarily enrich air-fuel ratio of exhaust gas for facilitating the release of NOx from said NOx absorbent catalyst, wherein said controller is operable to initiate said temporary enrichment control for facilitating the release of NOx from said NOx absorbent catalyst, wherein, after controller has initiated said temporary enrichment control, said controller is operable to input said second measure of air-fuel ratio of exhaust gas to monitor progress of enrichment of air-fuel ratio of exhaust gas in response to said second measure of air-fuel ratio, and wherein said controller is operable to change said target air-fuel ratio from the lean side toward the rich side with respect to the stoichiometry upon initiation of said temporary enrichment control and to hold said target air-fuel ratio changed over said temporary enrichment control, and wherein said controller is operable to use said second measure of air-fuel ratio as said actual air-fuel ratio input to said feedback control loop instead of said first measure of air-fuel ratio after the initiation of said temporary enrichment control until said controller determines in response to said second measure of air-fuel ratio that said second A/F sensor has switched from the lean side to the rich side in response to said second measure of air-fuel ratio, and further comprising, a three-way catalyst disposed downstream, with respect to flow of exhaust gas within said exhaust passageway, of said NOx absorbent catalyst, and a third A/F sensor for a third measure of air-fuel ratio of exhaust gas downstream, with respect to flow of exhaust gas in said exhaust passageway, of said three-way catalyst; and wherein said controller is operable to hold said feedback correction coefficient unaltered after said controller has determined that the second A/F sensor has switched from the lean side to the rich side during said temporary enrichment control until said controller terminates said temporary enrichment control when said controller determines in response to said third measure of air-fuel ratio that said third A/F sensor has switched from the lean side to the rich side.

21. An internal combustion engine system comprising:

a cylinder;

an intake passageway for admission of intake air into said cylinder;

a fuel injector for admission of fuel into said cylinder in response to a fuel control command;

an exhaust passageway for receiving exhaust gas resulting from combustion of combustible charge in said cylinder;

a NOx absorbent catalyst, disposed in said exhaust passageway, which absorbs nitrogen oxides (NOx) when air-fuel ratio within exhaust gas is on the lean side of the stoichiometry and releases NOx for reduction treatment when air-fuel ratio is at the stoichiometry or on the rich side;

a first A/F sensor for obtaining a first measure of air-fuel ratio of exhaust gas upstream, with respect to flow of exhaust gas in said exhaust passageway, of said NOx absorbent catalyst;

a second A/F sensor for obtaining a second measure of air-fuel ratio of exhaust gas downstream, with respect to flow of exhaust gas in said exhaust passageway, of said NOx absorbent catalyst; and a controller for generating said fuel control command, said controller including a feedback control loop for altering a feedback correction factor of said fuel control command in such a direction as to decrease a deviation of an actual air-fuel ratio input from a target air-fuel ratio toward zero, wherein usually said controller uses said first measure of air-fuel ratio of exhaust gas as said actual air-fuel ratio input to said feedback control loop, wherein said controller includes a temporary enrichment control to temporarily enrich air-fuel ratio of exhaust gas for facilitating the release of NOx from said NOx absorbent catalyst, wherein said controller is operable to initiate said temporary enrichment control for facilitating the release of NOx from said NOx absorbent catalyst, wherein, after controller has initiated said temporary enrichment control, said controller is operable to input said second measure of air-fuel ratio of exhaust gas to monitor progress of enrichment of air-fuel ratio of exhaust gas in response to said second measure of air-fuel ratio, and wherein said controller is operable to change said target air-fuel ratio from the lean side toward the rich side with respect to the stoichiometry upon initiation of said temporary enrichment control and to hold said target air-fuel ratio changed over said temporary enrichment control, and wherein said controller is operable to use said second measure of air-fuel ratio as said actual air-fuel ratio input to said feedback control loop instead of said first measure of air-fuel ratio after the initiation of said temporary enrichment control until said controller determines in response to said second measure of air-fuel ratio that said second A/F sensor has switched from the lean side to the rich side in response to said second measure of air-fuel ratio, and further comprising, a three-way catalyst disposed downstream, with respect to flow of exhaust gas within said exhaust passageway, of said NOx absorbent catalyst, and wherein said controller is operable to hold said feedback correction coefficient unaltered for a predetermined period of time after said controller has determined that said second A/F sensor has switched from the lean side to the rich side during said temporary enrichment control.

22. An internal combustion engine system as claimed in claim 21, wherein said controller is operable to alter said predetermined period of time in response to a period of time over which said three-way catalyst has operated during lean combustion mode.

23. An internal combustion engine system comprising:

a cylinder;

an intake passageway for admission of intake air into said cylinder;

a fuel injector for admission of fuel into said cylinder in response to a fuel control command;

an exhaust passageway for receiving exhaust gas resulting from combustion of combustible charge in said cylinder;

a NOx absorbent catalyst, disposed in said exhaust passageway, which absorbs nitrogen oxides (NOx) when air-fuel ratio within exhaust gas is on the lean side of the stoichiometry and releases NOx for reduction treatment when air-fuel ratio is at the stoichiometry or on the rich side;

a first A/F sensor for obtaining a first measure of air-fuel ratio of exhaust gas upstream, with respect to flow of exhaust gas in said exhaust passageway, of said NOx absorbent catalyst;

a second A/F sensor for obtaining a second measure of air-fuel ratio of exhaust gas downstream, with respect to flow of exhaust gas in said exhaust passageway, of said NOx absorbent catalyst; and a controller for generating said fuel control command, said controller including a feedback control loop for altering a feedback correction factor of said fuel control command in such a direction as to decrease a deviation of an actual air-fuel ratio input from a target air-fuel ratio toward zero, wherein usually said controller uses said first measure of air-fuel ratio of exhaust gas as said actual air-fuel ratio input to said feedback control loop, wherein said controller includes a temporary enrichment control to temporarily enrich air-fuel ratio of exhaust gas for facilitating the release of NOx from said NOx absorbent catalyst, wherein said controller is operable to initiate said temporary enrichment control for facilitating the release of NOx from said NOx absorbent catalyst, and wherein, after controller has initiated said temporary enrichment control, said controller is operable to input said second measure of air-fuel ratio of exhaust gas to monitor progress of enrichment of air-fuel ratio of exhaust gas in response to said second measure of air-fuel ratio, and further comprising, a three-way catalyst disposed downstream, with respect to flow of exhaust gas within said exhaust passageway, of said NOx absorbent catalyst, and a third A/F sensor for a third measure of air-fuel ratio of exhaust gas downstream, with respect to flow of exhaust gas in said exhaust passageway, of said three-way catalyst; and wherein said controller is operable to hold said feedback correction coefficient unaltered after said controller has determined that the second A/F sensor has switched from the lean side to the rich side during said temporary enrichment control until said controller terminates said temporary enrichment control when said third measure of air-fuel ratio accomplishes a predetermined relation with a predetermined value.

24. A lean-burn internal combustion engine for reducing the concentration of NOx by controlling air-fuel mixture in an intake passageway based on air-fuel ratio in an exhaust passageway, the system comprising:

a NOx absorbent catalyst, disposed in said exhaust passageway, which absorbs nitrogen oxides (NOx) when air-fuel ratio of exhaust gas is on the lean side from the stoichiometry and releases NOx when the air-fuel ratio is at the stoichiometry or on the rich side;

an air-fuel sensor positioned downstream of the NOx absorbent catalyst to sense an air-fuel ratio downstream of said NOx absorbent; and a controller for initiating a temporary enrichment of the air-fuel ratio, wherein said controller is operative to alter the air-fuel ratio of the intake passageway in such a direction as to reduce a deviation of the air-fuel ratio sensed by the air-fuel ratio sensor from the stoichiometry toward zero until determination of the air-fuel ratio sensor sensing a switch from the lean side to the rich side, wherein said controller is further operative to cause the temporary enrichment to end after the determination of the air-fuel ratio sensor sensing the switch from the lean side to the rich side.

25. An internal combustion engine system comprising:

a cylinder;

an intake passageway for admission of intake air into said cylinder;

a fuel injector for admission of fuel into said cylinder in response to a fuel control command;

an exhaust passageway for receiving exhaust gas resulting from combustion of combustible charge in said cylinder;

a NOx absorbent catalyst, disposed in said exhaust passageway, which absorbs nitrogen oxides (NOx) when air-fuel ratio within exhaust gas is on the lean side of the stoichiometry and releases NOx for reduction treatment when air-fuel ratio is at the stoichiometry or on the rich side;

a first air-fuel ratio sensor for obtaining a first measure of air-fuel ratio of exhaust gas upstream, with respect to flow of exhaust gas in said exhaust passageway, of said NOx absorbent catalyst;

a second air-fuel ratio sensor for obtaining a second measure of air-fuel ratio of exhaust gas downstream, with respect to flow of exhaust gas in said exhaust passageway, of said NOx absorbent catalyst; and a controller for generating said fuel control command, said controller including a first feedback control loop for altering a feedback correction factor of said fuel control command in such a direction as to decrease a deviation of an actual air-fuel ratio input from a target air-fuel ratio toward zero, and a second feedback control loop for altering said feedback correction factor of said fuel control command in such a direction as to decrease a deviation of its actual air-fuel ratio input from a target air-fuel ratio toward zero, wherein usually said controller uses said first measure of air-fuel ratio of exhaust gas as said actual air-fuel ratio input to said first feedback control loop and renders said second feedback control loop inoperable, wherein said controller is operable to change said target air-fuel ratio from the lean to the stoichiometry or rich, wherein said controller uses said second measure of air-fuel ratio of the exhaust gas as the actual air-fuel ratio input to said second feedback control loop immediately after said controller has changed said target air-fuel ratio from the lean to the stoichiometry or rich and renders said first feedback control loop inoperable, wherein said second feedback control loop perform its operation immediately after said controller has changed said target air-fuel ratio from the lean to the stoichiometry or rich until said second measure of air-fuel ratio of the exhaust gas downstream of said NOx absorbent catalyst switches the sides to rich, wherein said controller is operable to determine a value of said feedback correction factor that has been accomplished by said second feedback control loop immediately after said second measure of air-fuel ratio has switched the sides to rich, and uses said determined value of said correction factor in altering an initial value of said feedback correction factor during the subsequent operation of said second feedback control loop, wherein said controller is further operable to reduce said determined value of said feedback correction factor coefficient unless a predetermined minimum time has elapsed until said second measure of air-fuel ratio has switched the sides to rich.

26. An internal combustion engine system comprising:

a cylinder;

an intake passageway for admission of intake air into said cylinder;

a fuel injector for admission of fuel into said cylinder in response to a fuel control command;

an exhaust passageway for receiving exhaust gas resulting from combustion of combustible charge in said cylinder;

a NOx absorbent catalyst, disposed in said exhaust passageway, which absorbs NOx when an air-fuel ratio within exhaust gas is lean and releases NOx for reduction treatment when the air-fuel ratio is at the stoichiometry or is rich;

a first A/F sensor for obtaining a first measure of air-fuel ratio of exhaust gas upstream, with respect to flow of exhaust gas in said exhaust passageway, of said NOx absorbent catalyst;

a second A/F sensor for obtaining a second measure of air-fuel ratio of exhaust gas downstream, with respect to flow of exhaust gas in said exhaust passageway, of said NOx absorbent catalyst; and a controller for generating said fuel control command, wherein, in a normal enrichment control mode, said controller uses said first measure of air-fuel ratio of exhaust gas as an actual air-fuel ratio input to said feedback control loop, wherein, in a temporary enrichment control mode, said controller uses said second measure of air-fuel ratio of exhaust gas as said actual air-fuel ratio input to said feedback control loop, wherein said temporary enrichment control mode is commenced upon detection, by said controller, of a change in a target A/F ratio from lean to rich or to the stoichiometry indicated by a set flag, wherein, during said temporary enrichment control mode, only the output of the second A/F sensor is used by the controller to determine when to terminate said temporary enrichment control mode, wherein said temporary enrichment control mode is terminated by the controller immediately after said second measure of air-fuel ratio sensed by said second A/F sensor becomes rich, indicated by a reset flag, and wherein, upon termination of said temporary enrichment control mode, said controller immediately resumes operation under said normal enrichment control mode.

27. An internal combustion engine system comprising:

a cylinder;

an intake passageway for admission of intake air into said cylinder;

a fuel injector for admission of fuel into said cylinder in response to a fuel control command;

an exhaust passageway for receiving exhaust gas resulting from combustion of combustible charge in said cylinder;

a NOx absorbent catalyst, disposed in said exhaust passageway, which absorbs NOx when an air-fuel ratio within exhaust gas is lean and releases NOx for reduction treatment when the air-fuel ratio is at the stoichiometry or is rich;

a first A/F sensor for obtaining a first measure of air-fuel ratio of exhaust gas upstream, with respect to flow of exhaust gas in said exhaust passageway, of said NOx absorbent catalyst;

a second A/F sensor for obtaining a second measure of air-fuel ratio of exhaust gas downstream, with respect to flow of exhaust gas in said exhaust passageway, of said NOx absorbent catalyst; and a controller for generating said fuel control command, wherein, in a normal enrichment control mode, said controller uses said first measure of air-fuel ratio of exhaust gas as an actual air-fuel ratio input to said feedback control loop, wherein, in a temporary enrichment control mode, said controller uses said second measure of air-fuel ratio of exhaust gas as said actual air-fuel ratio input to said feedback control loop, wherein said temporary enrichment control mode is commenced upon detection, by said controller, of a change in a target A/F ratio from lean to rich or to the stoichiometry indicated by a set flag, wherein, during said temporary enrichment control mode, both the output of the second A/F sensor and a timer indicating time elapsed since commencement of temporary enrichment control mode are used by the controller to determine when to terminate said temporary enrichment control mode, wherein said temporary enrichment control mode is terminated by the controller after both said second measure of air-fuel ratio sensed by said second A/F sensor becomes rich and said time elapsed is greater than a predetermined minimum threshold, or after said time elapsed is greater than a predetermined maximum threshold, said termination of temporary enrichment control being indicated by a reset flag, and wherein, upon termination of said temporary enrichment control mode, said controller resumes operation under said normal enrichment control mode.

\* \* \* \* \*

UNITED STATES PATENT AND TRADEMARK OFFICE
CERTIFICATE OF CORRECTION

PATENT NO. : 6,116,023
DATED : September 12, 2000
INVENTOR(S) : Yasuji Ishizuka et al.

It is certified that error appears in the above-identified patent and that said Letters Patent is hereby corrected as shown below:

<u>Title page,</u>
Please insert:
-- [*]  Notice:
  This patent issued on a continued prosecution application filed under
  37 CFR 1.53(d), and is subject to the twenty year patent term provisions
  of 35 U.S.C. 1.54(a)(2)

Under 35 U.S.C. 1.54(b), the term of this patent shall be extended
  for 0 days --.

Signed and Sealed this

Eighth Day of October, 2002

Attest:

JAMES E. ROGAN
Attesting Officer  Director of the United States Patent and Trademark Office